A. E. IMLER.
FRICTION DRIVING MECHANISM.
APPLICATION FILED MAR. 23, 1911.

1,014,152.

Patented Jan. 9, 1912.
6 SHEETS—SHEET 1.

Witnesses
L. B. James
O. B. Hopkins

Inventor
A. E. Imler
by H. B. Willson & Co
Attorneys

A. E. IMLER.
FRICTION DRIVING MECHANISM.
APPLICATION FILED MAR. 23, 1911.

1,014,152.

Patented Jan. 9, 1912.
6 SHEETS—SHEET 3.

Witnesses
L. B. James
O. B. Hopkins

Inventor
A. E. Imler by
Attorneys

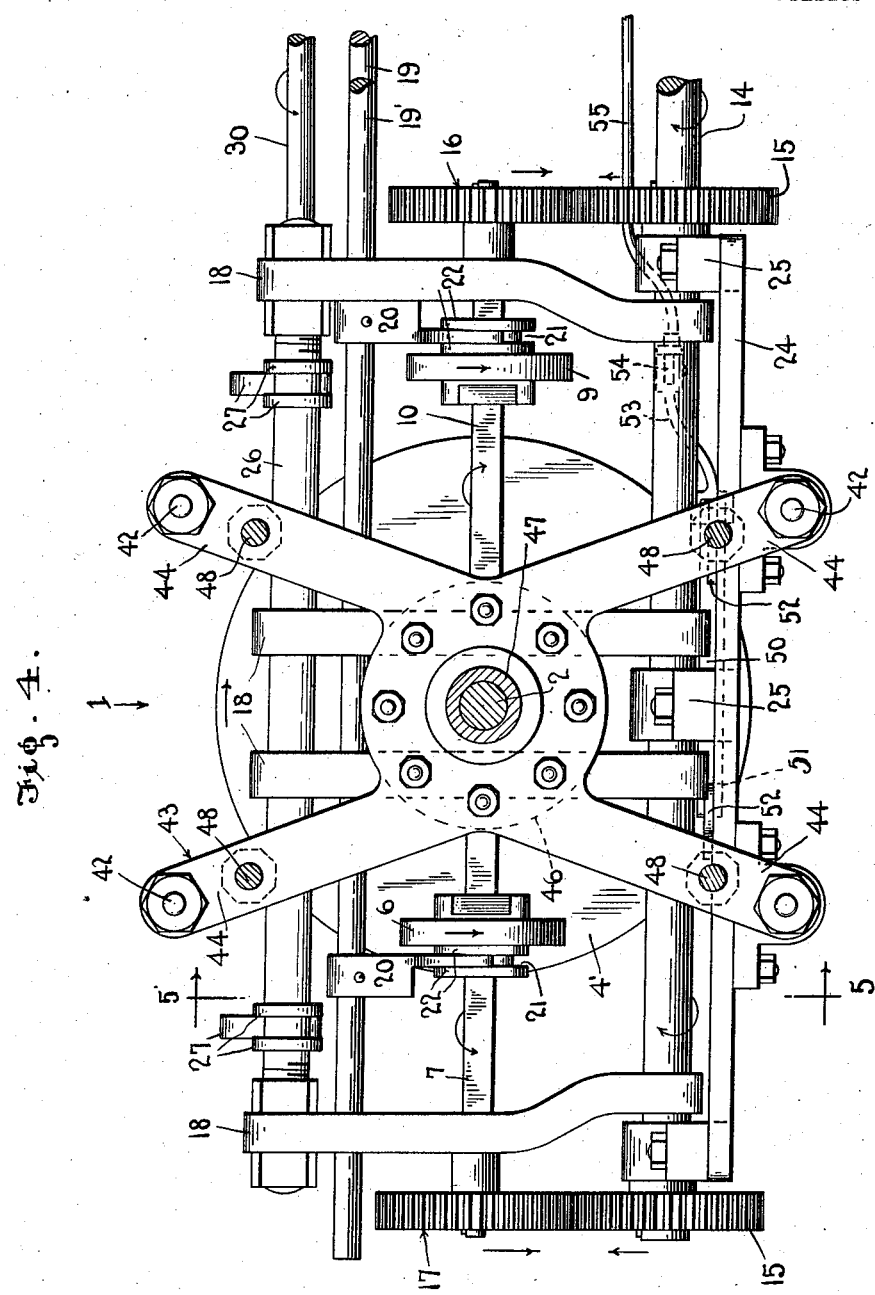

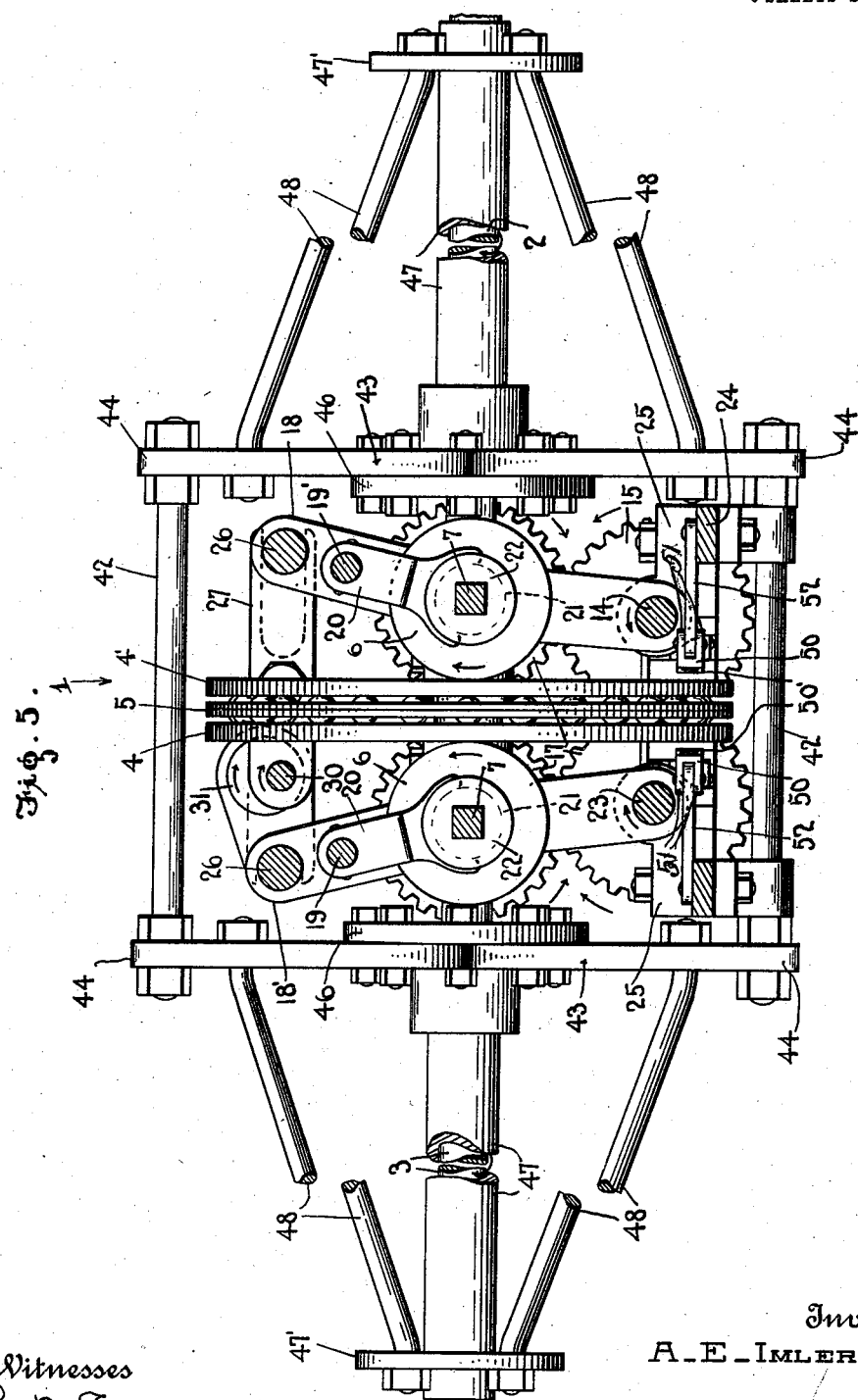

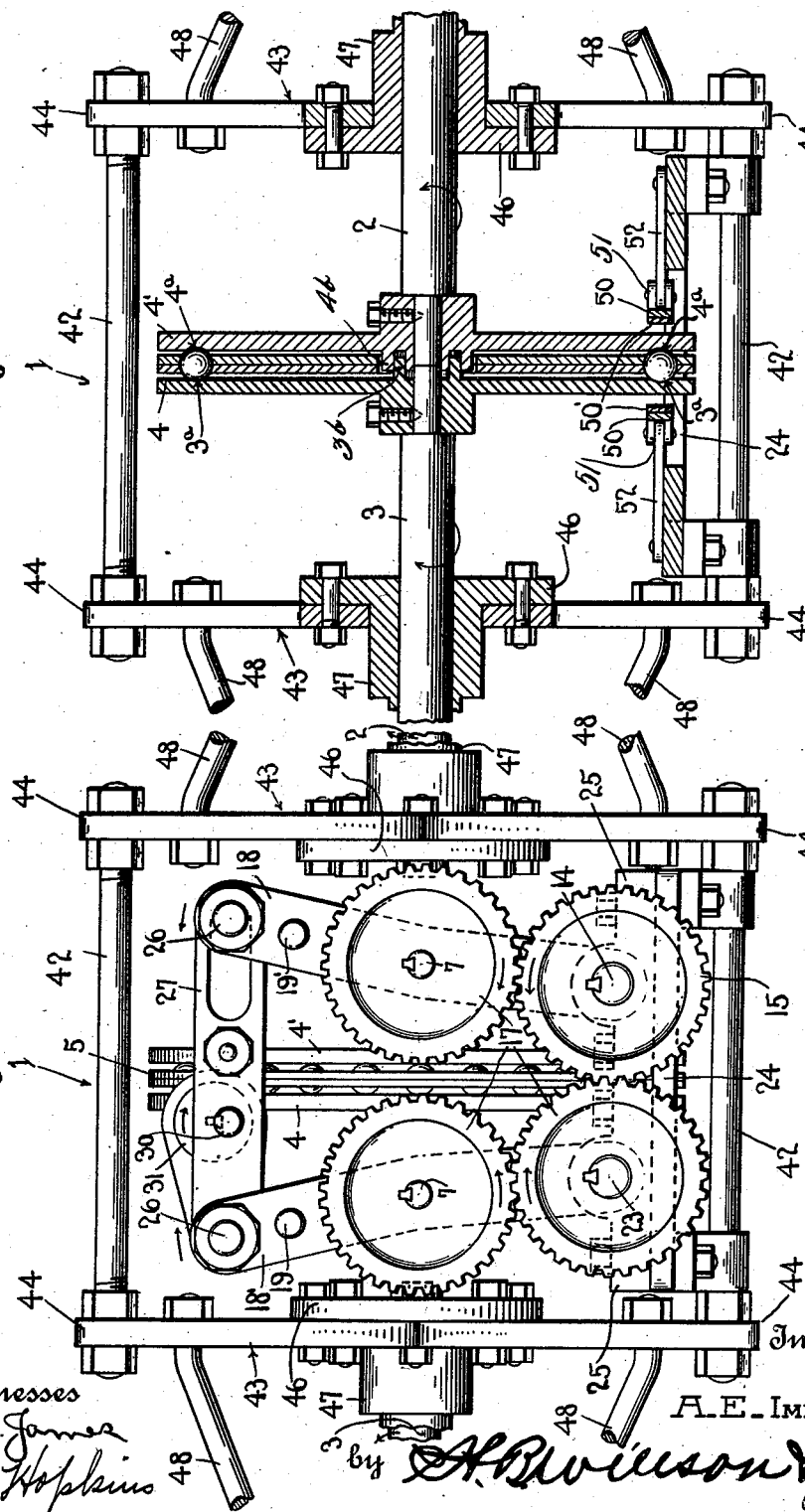

UNITED STATES PATENT OFFICE.

ALBERT E. IMLER, OF KALKASKA, MICHIGAN.

FRICTION DRIVING MECHANISM.

1,014,152. Specification of Letters Patent. Patented Jan. 9, 1912.

Application filed March 23, 1911. Serial No. 616,427.

*To all whom it may concern:*

Be it known that I, ALBERT E. IMLER, a citizen of the United States, residing at Kalkaska, in the county of Kalkaska and State of Michigan, have invented certain new and useful Improvements in Friction Driving Mechanism; and I do declare the following to be a full, clear, and exact description of the invention, such as will enable others skilled in the art to which it appertains to make and use the same.

This invention relates to an improved friction driving mechanism for vehicles.

The principal object of the invention is to provide a friction driving mechanism capable of serving as a substitute for the drive, reverse, transmission and differential gearing of ordinary motor vehicles.

Another object of the invention is to provide a friction driving mechanism so constructed as to permit one wheel to travel faster than the other and yet have no side draft.

Another object is to combine power and speed by connecting the engine shaft directly to small friction wheels by two gears only, and the driving wheel being smaller than the driven wheel, the power is greatly increased.

Another object is to provide means for preventing jerks when starting and to cause the vehicle to which the driving mechanism is applied to run smoothly.

With these and other objects in view, the invention consists of certain novel features of construction and the combination and arrangement of parts as will be more fully described and claimed.

Figure 1:
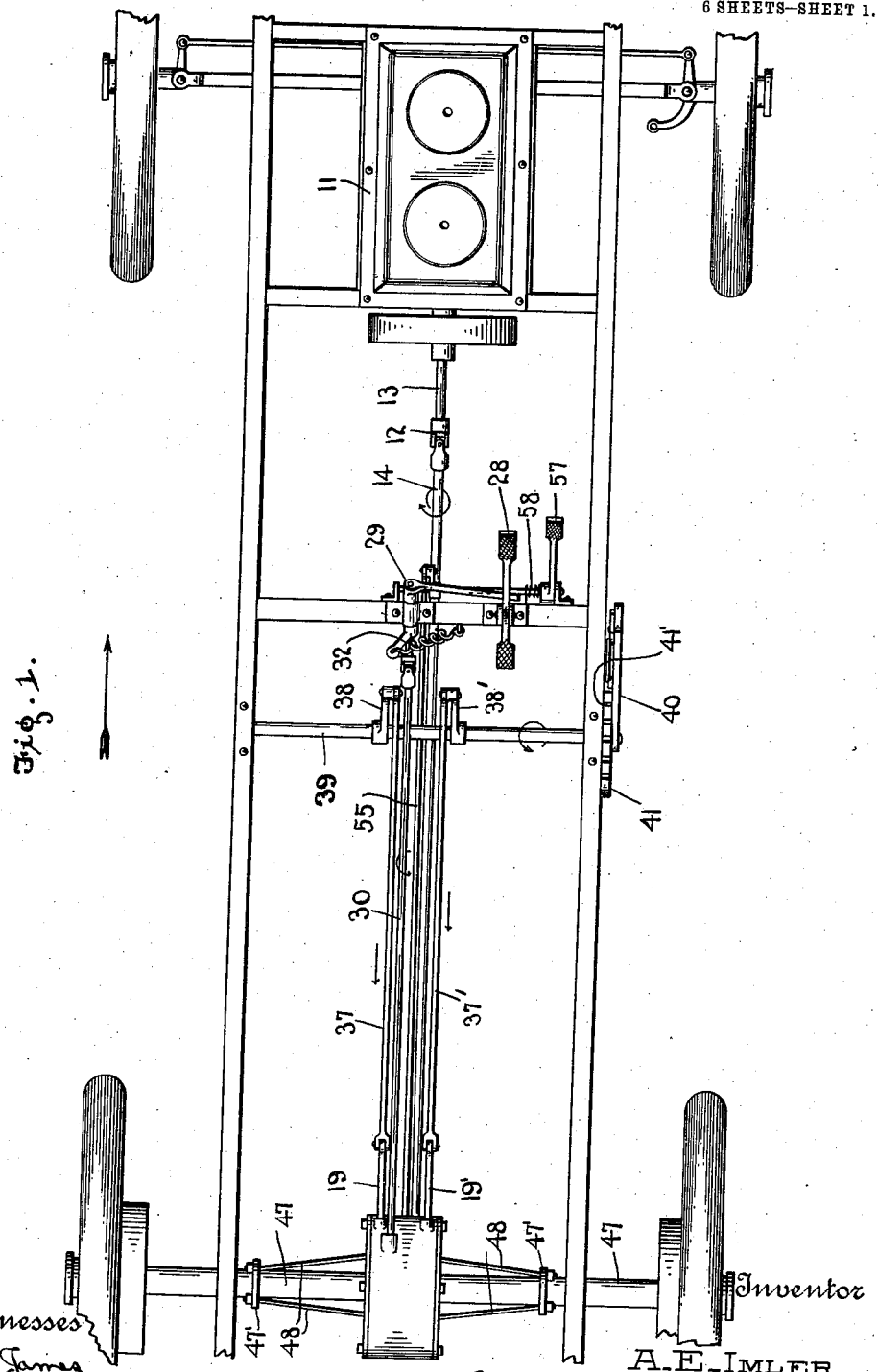
Figure 2:
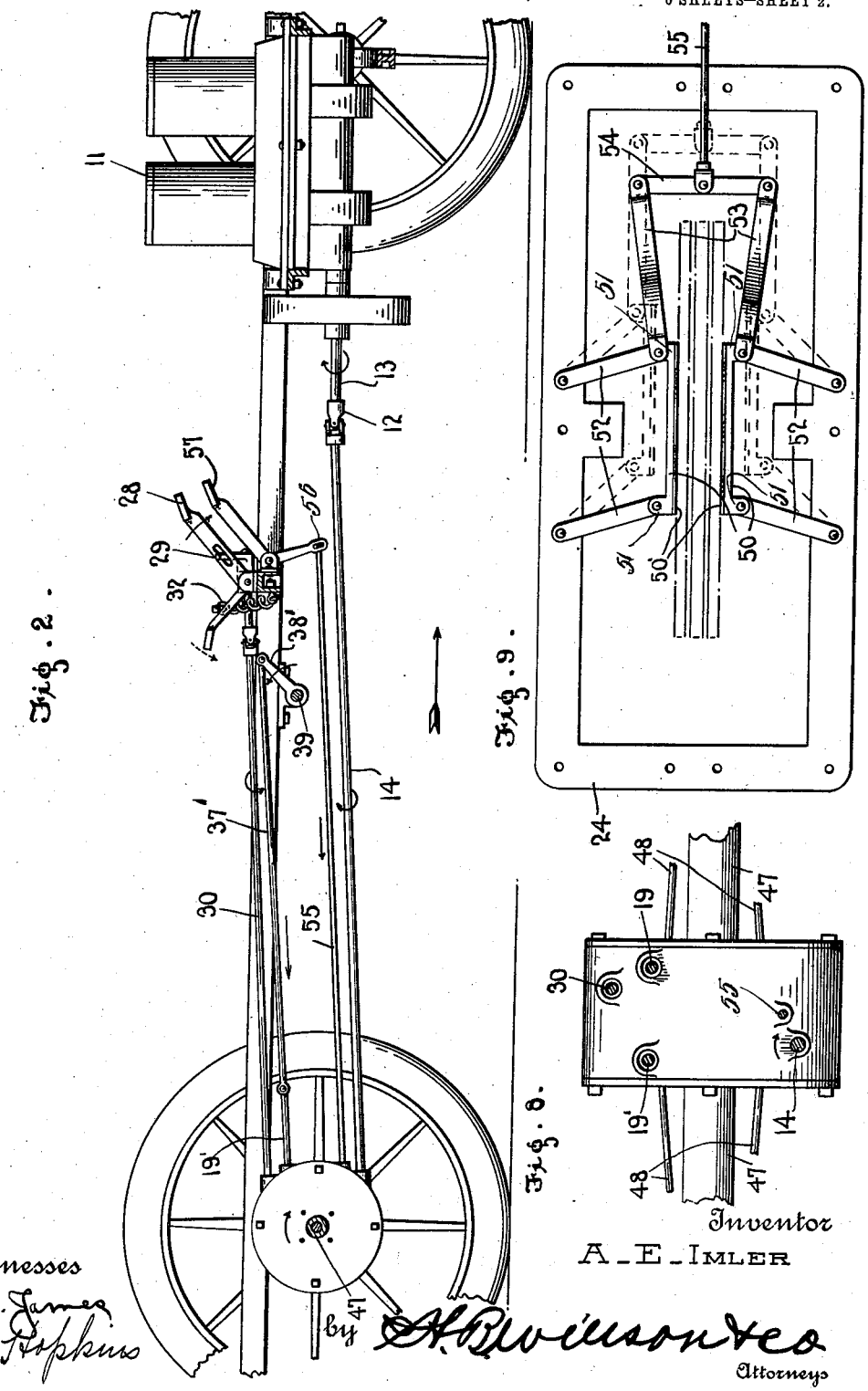
Figure 3:
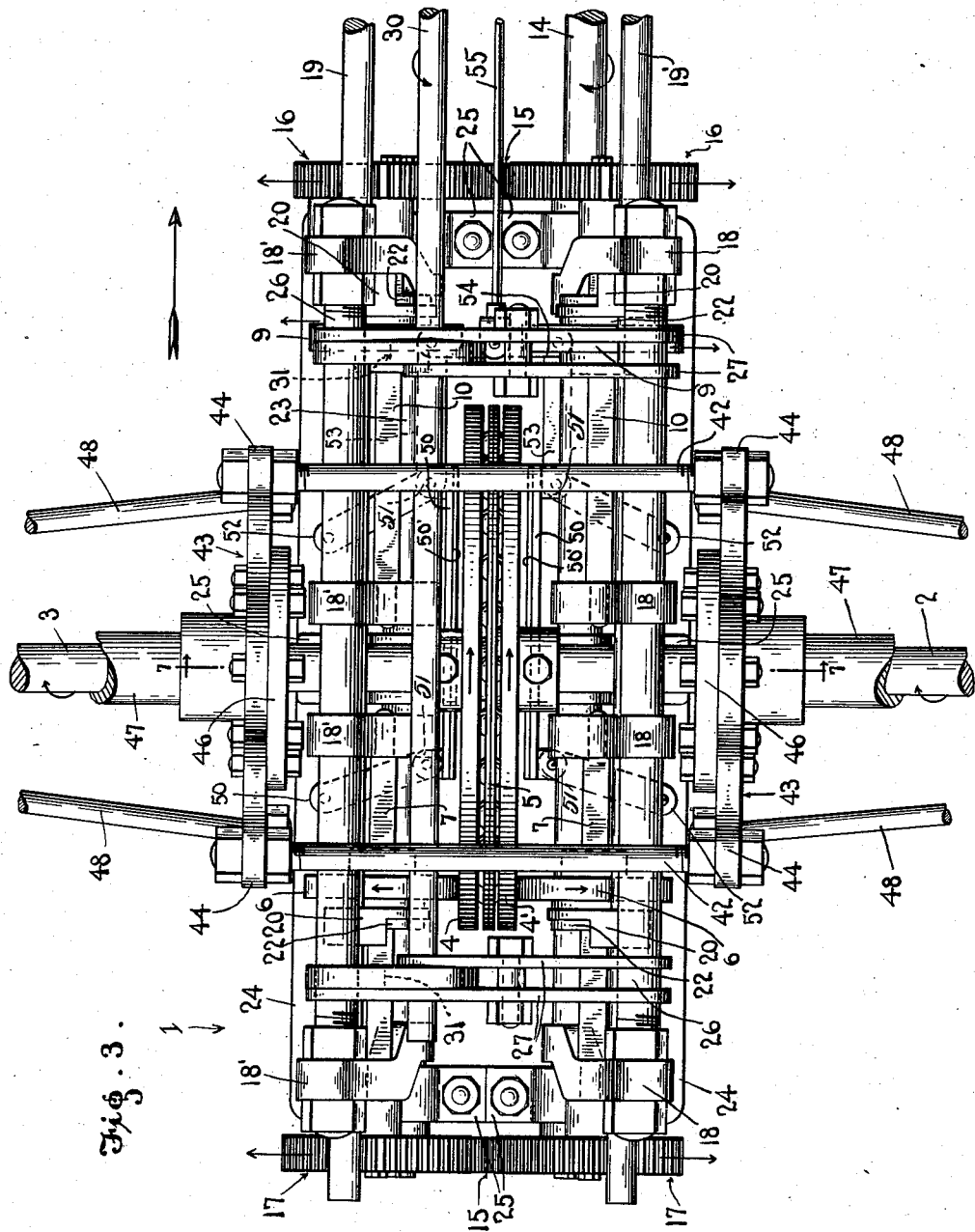

In the accompanying drawings: Figure 1 represents a top plan view of a motor vehicle frame equipped with this improved mechanism. Fig. 2 represents a side elevation thereof. Fig. 3 represents a plan view on an enlarged scale of this improved mechanism detached. Fig. 4 is an end elevation thereof with the axle shown in section. Fig. 5 is a longitudinal section partly in side elevation with parts broken out for convenience in illustration. Fig. 6 is a rear elevation thereof. Fig. 7 is a longitudinal vertical section with parts removed. Fig. 8 is an enlarged front elevation of the casing with the rods shown in section. Fig. 9 is a top plan view of the brake mechanism showing the friction disk in dot and dash.

In the embodiment illustrated, this improved driving mechanism 1 is shown applied to a motor vehicle and power is transmitted therethrough from the vehicle engine to the vehicle wheels, said mechanism being under the control of the operator.

The rear or driving axle is shown composed of two independent revoluble sections 2 and 3 to the inner ends of which are splined or otherwise fixed two large driven friction disks 4 and 4' which are about twelve inches in diameter, more or less, and are spaced a suitable distance apart to accommodate a ball thrust bearing disk 5 designed to relieve said friction disks of the side pressure as will be hereinafter described. The balls of this member 5 are adapted to engage annular grooves $3^a$ and $4^a$ formed in the inner faces of the disks 4 and 4'. The hubs of these disks are provided on their inner faces with annular intermeshing revolubly engaged collars $3^b$ and $4^b$ which support the adjacent ends of the axle sections 2 and 3 and permit them to revolve independently of each other. (See Fig. 7). This sectional axle is mounted in a supporting frame adapted to be secured to the vehicle to which the driving mechanism is to be applied and said frame may be of any suitable or desired construction. These driven disks 4 and 4' are engaged by friction driving wheels 6 arranged to slide on angular shafts 7, disposed at right angles to the axle, and to frictionally engage the outer faces of said disks 4 and 4'. These disks are preferably constructed of steel with aluminum faces. On the other side of the axle extending substantially at right angles thereto are angular shafts 10 similar to shafts 7 and which move in the same direction as said shafts 7. The driven disks 4 and 4' are engaged by friction driving wheels 9 similar to the driving wheels 6 which are slidably mounted on the shafts 10 and operable to drive the vehicle backward, the wheels 6 being employed to drive it forward.

To transmit power from the engine 11 of the vehicle to the driving mechanism 1 the main driving shaft 14 of said mechanism is connected by a universal joint 12 with the engine shaft 13. Spaced spur gears 15 are mounted on said drive shaft 14 and impart motion to the friction driving wheels 6 and 9 through the medium of a system of gears 16 and 17 placed upon opposite sides of the axles 2 and 3 and mounted in suitable bearing members 18 and 18', any desired number of which may be employed, four members 18 being here shown arranged on one side of the driven disk wheel and four as 18' on the other side.

Slidably mounted in the members 18 at opposite sides of the disk wheel are two friction drive wheel shifting rods 19 and 19' upon which are secured forked members 20 adapted to enter grooves 21 in collars 22 of said drive wheels 6 and 9 whereby said wheels are shifted when the rods are moved. The bearings 18 and 18' in conjunction with the shifting rods 19 and 19' form supplemental frames one of which is supported upon the main drive shaft 14 and the other on a shaft 23 arranged on the other side of the driven disks. These shafts 14 and 23 are mounted on a base 24 in suitable bearings 25 which hold the lower ends of said frames in laterally spaced relation to one another while the upper ends of said frames are spaced by tie rods 26. These frames are adapted to be swung upon the shafts 14 and 23 toward and from one another by links 27 which are operated by the manipulation of a foot treadle 28 within easy reach of the operator of the car. This treadle engages a lever 29 extending laterally from a rock shaft 30 arranged longitudinally of the car and which when turned forces the eccentrics 31 inwardly, thereby drawing the upper ends of said supplemental frames toward each other and thus applying additional pressure through the drive wheels upon the disk wheels other than that supplied by the force exerted thereagainst by a spring 32 which is connected at one end to the rock shaft 30 and at its other end to the frame of the vehicle and always holds said wheels against said disk unless manually released therefrom. The sliding friction wheel shifting rods 19 and 19' are connected at their free ends to one end of pitmen 37 and 37' the other ends of which are connected to crank arms 38 and 38' secured to a rock shaft 39. This shaft 39 may be actuated and locked in any desired position by means of a lever 40, rack 41, and dog 41' arranged within convenient reach of the driver.

Fixed to the base 24 on opposite sides of the driven disk are spider frames 43 which are held in spaced relation on opposite sides of the disk wheel by brace rods 42, while the arms 44 of said frames diverge and are connected by brace rods 48 with the outer ends of sleeves 47 which encircle the axle sections 2 and 3. The central plates of these frames 43 are bolted to flanges or collars 46 formed on the inner ends of the axle sleeves 47. The outer ends of the sleeves 47 are provided with collars 47' with which the rods 48 are connected and which serve to rigidly retain said mechanism in position.

I preferably employ emergency brakes for use on both sides of the friction disks which are clearly shown in Figs. 7 and 9 and comprise brake shoes 50 of any suitable material and which may be of any suitable or desired shape being here shown rectangular and having fiber friction faces 50' for engagement with the outer faces of said disks just below the drive shaft 14. As shown the shoes 50 are provided with laterally extending apertured lugs 51 at opposite ends thereof with which links 52 are pivotally connected at one end. These links 52 are pivoted at their outer ends to the base frame 24. Links 53 are also pivoted at one end to the lugs 51 at the front end of the shoes and the free ends of these links 53 are pivotally connected to the opposite ends of a cross bar 54. These links and shoes form a toggle-like structure and are operated by a rod or pitman 55 which is connected at one end to said cross bar 54 midway its length and at its other end is connected with the free end of a bell crank lever 56 fulcrumed on the machine frame adjacent the pedal 28.

The free end of the other arm of the bell crank lever 56 has a pedal 57 formed thereon for depression by the foot of the operator which when depressed forces the rod 55 forward and causes the links to move inwardly and force the brake shoes 50 into engagement with the disks 4 and 4' when it is found necessary for any reason to apply emergency brakes. This brake is held normally in open or inoperative position and returned to said position after operation by a spring 58 and thrown into operative position by pressure exerted on the pedal 57.

When the motor of the vehicle is started and it is desired that the machine move forward the driver releases the lever 40 from the rack 41' and throws said lever forward which through the system of levers above described causes the shifting rods 19 and 19' to pull the front driving wheels 6 into contact with the friction disks 4 and 4' which will readily engage the friction faces through the eccentric mechanism which is normally operated by the spring 32, but should the tenson of the spring not be sufficient to produce the proper power required the driver presses his foot on the treadle 28 thereby exerting abnormal pressure on the friction disks by the drive wheels 6 which pressure is relieved from the inner opposed faces of said driven disks by the thrust bearing 5. As the speed increases the driver throws his lever farther forward which moves the sliding driving wheels nearer the axle.

Should it be desired to reverse the machine the controlling lever is moved rearwardly which causes the wheels 6 to slide off the friction faces of the driven disks and slides the wheels 9 onto said disks moving them forward until the desired speed has been attained.

When a very low speed is desired with the machine moving forward the friction wheels 6 are moved a trifle over the peripheries of the driven disks 4 and 4' and are then drawn toward each other until they are brought into position to cause their sides to be applied to the peripheries of said disks. This movement is accomplished by the actuation of the eccentrics 31 through the depression of treadle 28 which draws the supplemental frames carrying the driving wheels 6 toward each other and thus forces the side faces of wheels 6 against the peripheries of disks 4 and 4' and slowly drives said disks. The speed so imparted may be varied by exerting more or less pressure on the treadle 28 and thus moving the wheels 6 a greater or less distance over the peripheries of said disks. The farther the wheels 6 are projected, the greater will be the speed imparted to the disks. The extent of movement toward each other of the wheels 6 is limited by the size of the cam 31 and its eccentricity which is proportioned to permit said wheels 6 to be moved toward each other a sufficient distance to cause their peripheries to just escape contacting. The same operation may be performed to reverse the direction of the vehicle by the application of the wheels 9 in the same manner.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention claimed.

I claim:—

1. A friction driving mechanism including driven disks, friction drive wheels mounted to engage the outer faces of said driven disks and the peripheries thereof, and means under the control of the operator for applying said drive wheels to the faces or peripheries of said disk for varying the speed of said disks.

2. A friction driving mechanism including driven disks, friction drive wheels mounted to engage the outer faces of said driven disks and the peripheries thereof, means under the control of the operator for applying said drive wheels to the faces or peripheries of said disks for varying the speed of said disks, and means for limiting the movement of said drive wheels toward each other.

3. A friction driving mechanism comprising a supporting structure, an axle, a friction disk fixed to said axle, angular shafts mounted in said structure at right angles to said axle, driving wheels slidable on said shafts, bearing members pivotally mounted in said structure, shifting rods slidably mounted in said bearing members, means fixed to said rods and engaged with said driving wheels, whereby said wheels are connected to move with said rods, and means under the control of the operator for moving said bearing members toward and away from each other to bring said driving wheels into and out of engagement with said disks.

4. A friction driving mechanism comprising a supporting structure, axle sections mounted therein and arranged in longitudinal alinement with their inner ends in close proximity, friction disks fixed to said sections adjacent their inner ends, a thrust plate arranged between said disks, friction driving wheels mounted in said structure in position to engage said disks, bearing members pivotally mounted in said structure on opposite sides of said disks and movable toward and away from each other, shifting rods slidably mounted in said bearing members, fixed means on said shifting rods and detachably engaged with said driving wheels whereby said wheels are connected to move with said rods, a rock shaft, means for operating said rock shaft, and means connected with said bearing members and operable by said rock shaft for moving said bearing members toward and away from each other, whereby said driving wheels are engaged with and disengaged from said disks.

5. A friction driving mechanism comprising two independently revoluble driven disks, a ball thrust plate arranged between them whereby side pressure on the bearings is prevented, slidably mounted friction drive wheels arranged to engage the outer faces of said disks, and means for moving said drive wheels into position to cause the flat faces thereof to engage the peripheries of said disks to cause said disks to be driven at a slow speed.

6. A friction driving mechanism including driven disks, friction drive wheels mounted to engage the opposite faces of said disks, means for applying said drive wheels simultaneously to the sides of said disks, and brake shoes arranged to engage both of said disks.

7. A friction driving mechanism including driven disks, friction drive wheels mounted to engage the outer faces of said disks, means for applying said drive wheels simultaneously to said disks, a fixed support, brake shoes links pivotally connected at one end to said brake shoes and at their other ends to said fixed support, links pivotally connected at one end to said brake shoes, a cross bar connected at its opposite ends to the free ends of said last mentioned links, and means connected with said cross bar for actuating it.

8. A friction driving mechanism including driven disks, friction drive wheels mounted to engage the outer faces of said disks, means for applying said drive wheels simultaneously to both of said disks, brake shoes arranged to engage both of said disks, a fixed support, links pivotally connected at one end to said brake shoes and at their other ends to said fixed support, links pivotally connected at one end to said brake shoes, a cross bar connected at its opposite ends to the free ends of said last mentioned links, a rod connected at one end to said cross bar, a pedal connected with said rod for actuating the same, and means for holding said shoes normally in open position.

9. The combination of power generating means, means for transmitting power from said power generating means, means for shifting said power transmitting means to inoperative position without stopping said power generating means, and means to compensate for the excessive speed attained by said power generating means when said power transmitting means are rendered powerless.

In testimony whereof I have hereunto set my hand in presence of two subscribing witnesses.

ALBERT E. IMLER.

Witnesses:
  HAROLD B. WHALLEY,
  C. M. SWAVERLY.

---

Copies of this patent may be obtained for five cents each, by addressing the "Commissioner of Patents, Washington, D. C."